United States Patent [19]

Um

[11] Patent Number: 5,032,906
[45] Date of Patent: Jul. 16, 1991

[54] INTENSITY CALIBRATION METHOD FOR SCENE PROJECTOR

[75] Inventor: Gregory Um, Torrance, Calif.

[73] Assignee: Aura Systems, Inc., El Segundo, Calif.

[21] Appl. No.: 379,326

[22] Filed: Jul. 12, 1989

[51] Int. Cl.⁵ .............................................. H04N 7/18
[52] U.S. Cl. .................................... 358/139; 358/903
[58] Field of Search ............... 358/139, 903, 231, 60; 369/571.02, 571.03, 571.04, 571.05

[56] References Cited

U.S. PATENT DOCUMENTS 4,754,329  6/1988  Lindsay et al. ..................... 358/139

OTHER PUBLICATIONS

"Broad-Band Guided-Wave Electrooptic Modulators", Becker, IEEE Journal Quantum Electronics, vol. QE-20, #7, Jul. 1984.
"Linear Interferometric Modulators In Ti:LiNbO₃", Journal of Lightwave Technology, vol. LT-2, #4, Aug. 1984.

Primary Examiner—Victor R. Kostak
Attorney, Agent, or Firm—Poms, Smith, Lande & Rose

[57] ABSTRACT

A scene projector is calibrated by providing a look-up table for intensity adjustment values of each pixel of the displayed frame. The look-up table is formed by calculating a ratio of measured intensity of each pixel to the intensity of the pixel of minimum intensity when power and scene modulation controls are at maximum. Power modulator control response and scene modulator control response curves are generated, and a black body calibration is performed to define the relation between black body temperature, power modulator and scene modulator settings. Power modulator control settings are determined for each of a number of selected black body temperatures, and a scene modulator setting is determined that is required to obtain a proper black body temperature. These values are stored in a second table and combined with intensity value corrections from the intensity value table to modify image data.

1 Claim, 2 Drawing Sheets

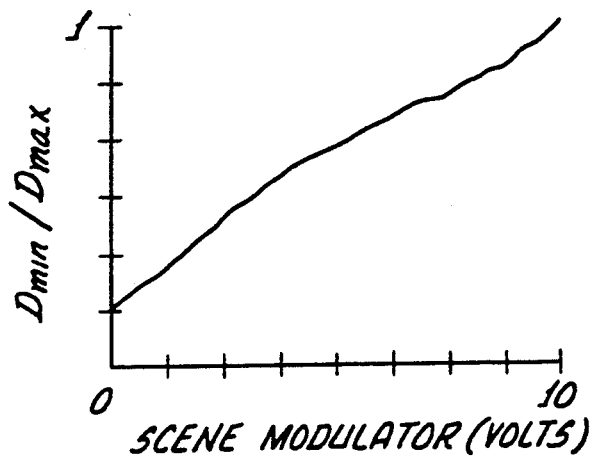
_Fig. 3._
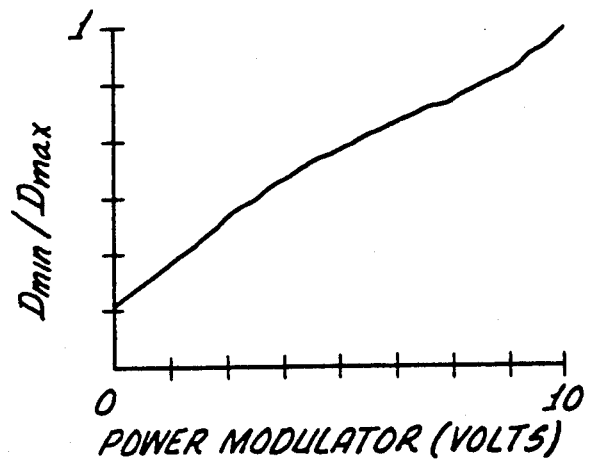
_Fig. 2._
_Fig. 4._
| BLACKBODY | POWER MODULATOR | SCENE MODULATOR |
|---|---|---|
| 1300°K | 10 VOLTS | ? |
| * | * | * |
| ** | ** | ** |
| * | * | * |
| 500°K | 5.3 VOLTS | ? |
| * | * | * |
| * | * | * |
| 300°K | 1 VOLT | ? |

INTENSITY CALIBRATION METHOD FOR SCENE PROJECTOR

BACKGROUND OF THE INVENTION

1. Field of the Invention

The present invention relates generally to scene projectors, and more particularly, to a novel method for accurately calibrating the output intensity of a scene projector.

2. Description of Related Art

A typical scene projector displays an image from a plurality of successive frames. Each of the frames includes a plurality of pixels. Each pixel has an intensity determined by a corresponding pixel intensity value stored in a memory. The scene projector has a power modulation control which controls the overall intensity of the scene projector and a scene modulation control which controls the intensity of individual pixels.

Scene projectors are particularly useful for displaying a simulated image of an event. Such simulation is desirable when by the nature of the occurrence of the event, the event is catastrophic or economically unfeasible to replicate. However, there is a need to measure optical output intensity from such events. Usually, the optical output being measured is in the infrared spectrum. A simulated image on the scene projector then needs to be calibrated such that its output intensity represents the infrared intensity of the event.

SUMMARY OF THE INVENTION

According to the present invention, a method for calibrating a scene projector, such as hereinabove described, includes computing an intensity adjustment value for each pixel. The intensity adjustment value is then stored in a first table. The intensity adjustment value is calculated as a ratio of the measured intensity of each of the pixels to the intensity of one of the pixels having a minimum intensity when the power modulation control and scene modulation control are at preselected settings, such as their maximum setting. The first table then provides the first correction for the displayed pixels.

Next, a power modulator control response curve is generated. The response curve is determined as a ratio of the overall intensity of the scene projector at any power control settings to the overall intensity of the scene projector when the power control is set at maximum intensity. Similarly, a scene modulator control response curve is generated.

Subsequent to generating the above response curve, a black body calibration is performed. The black body calibration defines the relationship between the black body temperature, the power modulator and scene modulator settings. For each frame, the maximum black body temperature will correspond to a power modulator control setting. Once the power modulator control setting is determined, the scene modulator setting that is required is determined to give the proper black body temperature. These values are then stored in a second table. This value is summed with the intensity value to form a correction factor for the pixel value from memory.

These and other objects, advantages and features of the present invention will become readily apparent to those skilled in the art from a study of the following description of an exemplary preferred embodiment when read in conjunction with the attached drawings and appended claims.

BRIEF DESCRIPTION OF THE DRAWINGS

FIG. 2 and FIG. 3 are power modulation control and scene modulation control response curves, respectively; and FIG. 4 is a calibration table developed according to the principles of the present invention.

DESCRIPTION OF AN EXEMPLARY PREFERRED EMBODIMENT

Figure 1:
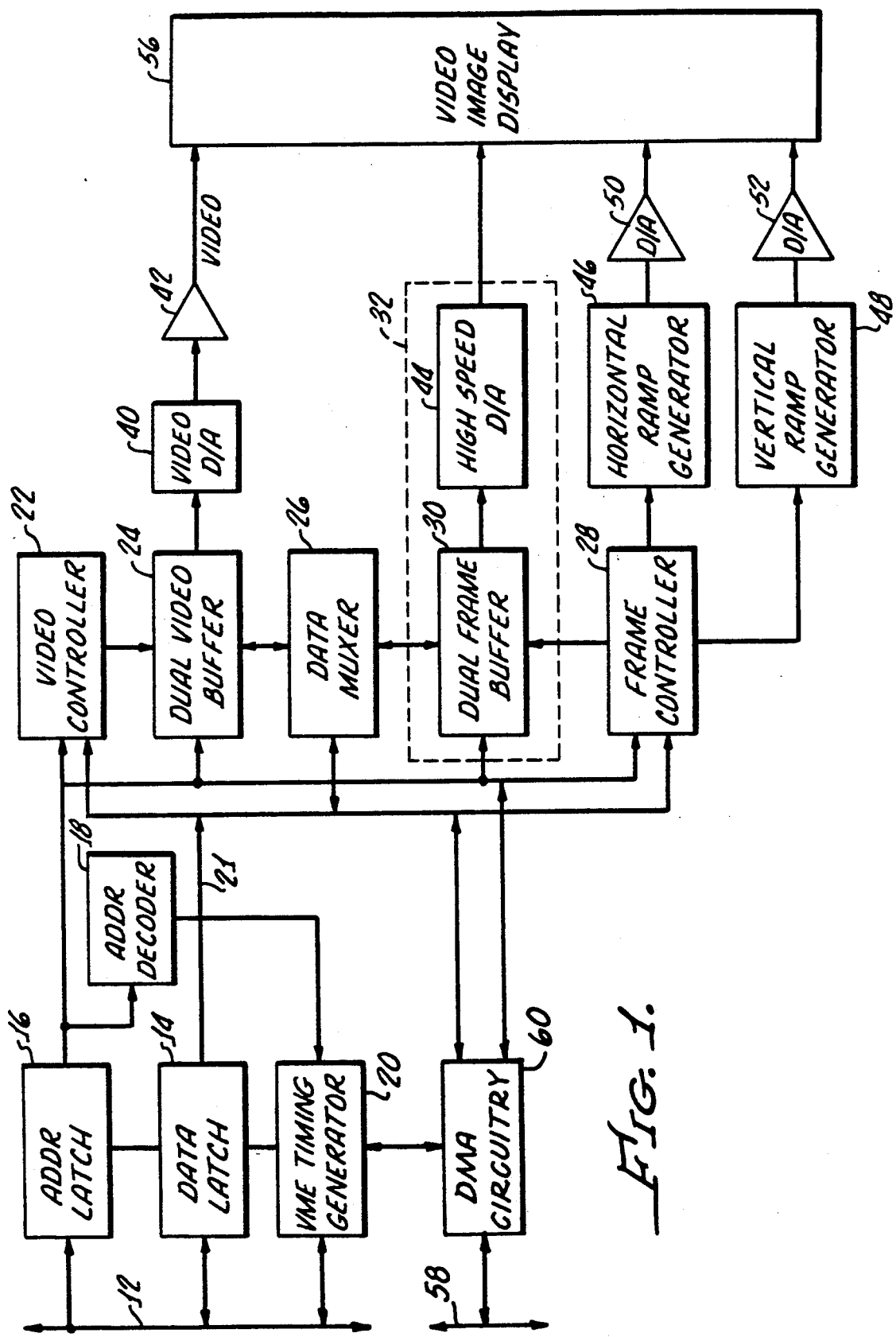
FIG. 1 is a block diagram of the control circuitry of a scene projector useful to describe the method of the present invention.

Referring now to FIG. 1, there is shown a block diagram of a scene projector and electrical circuitry therefor. Pixel values are read from a memory (not shown) which stores an array of pixels for each frame. Pixel values can be read from the memory, put on a VME bus 12 and fed to a data latch 16. The VME bus 12 also transfers addresses which are fed to an address latch 16, having an output to an address decoder 18, which is connected with a timing generator 20. With appropriate addressing and controls, the pixel data is fed via a data bus 21 to a video controller 22, a dual frame video buffer 24, via a data multiplier 26, and also to a frame controller 28. Address information is fed from the address latch to the video controller 22, dual video buffer 24, dual frame buffer 30, and frame controller 28. Data is also fed to dual frame buffer 30 from data multiplexer 26. Video data from buffer 24 is fed through a video digital to analog converter 40 (D/A converter) and an amplifier 42 to the video display 56. Data from dual frame buffer 30 is fed through a high speed digital to analog converter 44 (high speed DA converter) while signals from the frame controller are fed to a horizontal ramp generator 46 and a vertical ramp generator 48 which, with D/A converters 50 and 52, feed fast and slow deflection signals respectively to suitable horizontal and vertical deflection circuits that control horizontal and vertical sweep of the projected energy beam across a video image display device 56.

A dual frame buffer 30 and high speed D/A converter 42 are provided for each channel of the system. Accordingly, there are as many channel units 32 consisting of a dual frame buffer 30 and highspeed D/A converter 42 as there are channels. The output of channel unit 32 is sent to the scene modulator, also known as a scophony modulators, in video image display 56.

A local bus extension to VME bus 12 is VSB bus 58. VSB bus 58 can implement a fast local interface between a frame buffer, part of the memory holding pixel data, and other elements of the system illustrated in FIG. 1 via direct memory access (DMA) circuitry 60. DMA circuitry 60 has known elements including synchronization circuitry and arbitration circuitry to facilitate data transfers.

According to the present invention, the calibration data calculated according to the method of the present invention is also stored in the memory and summed with the pixel values on the VME bus. The method for calculating the values for the correction tables is set forth more fully hereinbelow.

The purpose of the calibration is to adjust for the irregularities in the scene projection system and to determine what values are necessary to command the scene projector to achieve the desired simulated output temperature. The two basic control points are the power modulator and the scene modulator. The power modulator control provides an overall output control while the scene modulator provides for a pixel-by-pixel intensity adjustment. The data inputs for each control are in the form of 12 bit values which define non-negative pixel intensities ranging from 0 to 4095. The first correction is an intensity adjustment table. This table has an entry for each pixel in the frame. Each entry in this table is the ratio of the intensity measured at a pixel location divided by the intensity measured of the minimum intensity pixel. Each ratio therefore is a value equal to or greater than one. The table is stored in integer format by scaling the ratio by 1,000. The calculation for each ratio therefore is:

$$IAR = INT((I_{ij}/I_m)*1000) \qquad \text{Eq. 1}$$

The first step in the calibration is to determine the center of each pixel and its measured intensity when both the power modulator and scene modulator are set to maximum. Since the power modulator is a single control variable, it is set just once for all of the pixel locations. The power modulator is set to about 50% of maximum value. The following steps are iterated for each pixel in the frame;

1. Initialize intensity adjustment table to all ones.
2. Set intensity of pixel i,j to its maximum value. This is accomplished by direct interface by VME bus 12. Each control circuitry has two separate buffers, each sized for one frame of pixel data (the dual frame buffer). Initially, the buffers for all pixels are set equally to zero. Since these buffers are accessible from the VME bus, it is possible to store data in them directly. The value of 4095 is put into a pixel location i, j and a command to switch buffers is made. This causes the scene projector to display a single pixel at the specified location. When measurements on this pixel are complete, a switch buffer command will display all zeros again, showing the original buffer.
3. A centroiding routine is called. This routine controls the xy translation device and takes readings of the average and standard deviation of detector output. Average readout and standard deviation in variance can be rounded to the nearest integer if required. The result will be the location of the center of the pixel and its average output and variance as measured with the detector located at its center.
4. The centroiding routine results are stored in a pixel calibration table.

Once all the pixel locations have been determined and their intensities measured and saved, a scan of the data is made to determine the pixel with the lowest intensity Once this value is determined, the intensity adjustment ratio for each pixel position can then be calculated using equation (1) above. The intensity adjustment ratio is then stored in a pixel calibration table. After processing, the pixel calibration table holds the necessary scene modulator values for each pixel to allow a constant intensity level to be displayed over the entire frame area. This intensity is equivalent to the highest level that can be obtained by the pixel with the lowest intensity level when both the power modulator and scene modulator are set to maximum. The pixel calibration table also has the location of the center of each pixel measured in both pixel units and absolute units. The following steps are performed:

(1) Formulate an intensity adjustment table from the pixel calibration table and store it in memory. This table has the required identifying information.

(2) A set of pixel locations are selected for testing of the intensity adjustment table. For each of three power modulator settings, 30%, 50% and 70%, the raw scene modulator (before translation through the intensity adjustment table) is set to three levels, 10%, 30% and 70%. The average deviation is then displayed.

The next step in calibration of the scene projector is to develop power modulator and scene modulator response curves. The purpose of these curves is to determine the response in detector output to changes in either the power modulator or the scene modulator. Two separate tests are run. The first test holds the scene modulator intensity constant and varies the power modulator. The second test holds the power modulator intensity constant and varies the scene modulator.

The power modulator response curve as best seen in FIG. 2 is generated by setting the scene modulator to a fixed value and varying the power modulator intensity from 10 to 0 volts. The intensity output is measured by the calibration detector and a ratio value is determined by dividing the intensity measured in any power modulator setting by the intensity measured with the power modulator set to 10 volts. Thus, the power modulation ratio, $PM_r$ may be expressed as follows:

$$PM_r = D_{min}/D_{max} \qquad \text{Eq. 2}$$

This test should be run with the detector placed in the center of the frame. Although this curve should be insensitive to the scene modulator intensity, this curve will be generated three times at scene modulator settings of 25%, 50% and 75% to verify this insensitivity.

The scene modulator response curve as best seen in FIG. 3 is generated by setting the power modulator to a fixed value and varying the scene modulator intensity from 10 to 0 volts. The intensity output is measured by the calibration detector and a ratio value is determined by dividing the intensity measured in any scene modulator setting by the intensity measured with the scene modulator set to 10 volts. The scene modulator ratio, $SM_r$ may be expressed as follows:

$$SM_r = D_{min}/D_{max} \qquad \text{Eq. 3}$$

Again, this test should be run with the detector placed in the center of the frame. Although this curve should be insensitive to the power modulator intensity, this curve will be generated three time at the power modulator settings of 25%, 50% and 75% to verify the insensitivity.

Next, a black body calibration needs to be performed. The purpose of the black body calibration is to associate black body temperature levels with that of the detector readouts from the calibration detector located on the xy translation device. The following procedures need to be executed at black body temperature from 300° K. to 1300° K. in 100° increments for each spectral filter:

1. Manually set black body temperature to "t." Wait for 10 minutes for the temperature to stabilize.
2. Position detector to selected pixel positions and measure the detector output for each pixel position.
3. Determine the average intensity and standard deviation of all the pixel detector readings for temperature "t." Enter the values into a black body calibration table as best seen in FIG. 4.

The black body calibration table defines the relationship between black body temperature and power modulator/scene modulator settings. The calibration table has black body temperature and predetermined power modulator settings that are associated with that particular temperature. The last column is the scene modulator that is required, along with the power modulator setting, to give the proper black body temperature.

At each temperature "t." in the calibration table, the following procedure is executed to determine the scene modulator intensity setting:

1. Extract the detector reading for the temperature t from the black body calibration table. This is the value that will have to be matched by the proper setting of both the power modulator and the scene modulator.

2. Extract the power modulator setting associated with the temperature t from the calibration table of FIG. 4. The power modulator is then set.

3. Position the xy translation device to each of the selected pixels and perform the following two steps for each position.

4. Adjust the scene modulator setting for the pixel position specified in step 3 until it matches as closely as possible the detector reading selected in step one. The scene modulator setting is saved in the appropriate location of the calibration table of FIG. 4.

5. Check and display all the measurements taken from step four immediately hereinabove. Determine and display the deviation of the readings.

This calibration is then saved so it can be used to pre-process the image data before transmission to the scene projector.

There has been described hereinabove a novel method for calibrating a scene projector. Those skilled in the art may now make numerous uses of and departures from the description of the exemplary preferred embodiments set forth above without departing from the inventive concepts therein. Accordingly, the present invention is to be defined solely by the following claims.

What is claimed is:

1. A method for calibrating a scene projector wherein said scene projector displays an image from a plurality of successive frames, each of said frames having a plurality pixels, each of said pixels having an intensity determined by a corresponding pixel intensity value stored in a memory, said scene projector having a power modulation control to control overall intensity of said scene projector and a scene modulation control to control intensity of individual ones of said pixels, said method comprising:

computing an intensity adjustment value for each of said pixels and storing each intensity adjustment value in a first table, said intensity adjustment value being calculated as a ratio of measured intensity of each of said pixels to intensity of one of said pixels having a minimum intensity when said power control and said scene control are at preselected settings;

generating a power modulator control response curve as a function of a ratio of overall intensity of said scene projector at any control power setting to overall intensity of said scene projector when said power control is set at maximum intensity;

generating a scene modulator control response curve as a function of a ratio of intensity of said scene projector at any setting of said scene modulation control to intensity of said scene projector when said scene modulation control is at maximum intensity;

correlating output intensity of said scene projector to black body temperature levels; and computing the scene modulation control setting for each pixel as a function of black body temperature and power modulation control setting representing said black body temperature.

* * * * *